United States Patent [19]

Williams

[11] Patent Number: 4,736,593
[45] Date of Patent: Apr. 12, 1988

[54] FROZEN BEVERAGE MACHINE

[76] Inventor: J. Dolph Williams, 1600 Furman, Ruston, La. 71270

[21] Appl. No.: 56,263

[22] Filed: May 26, 1987

Related U.S. Application Data

[63] Continuation of Ser. No. 806,046, Dec. 6, 1985, abandoned.

[51] Int. Cl.$^4$ .............................................. A23G 9/00
[52] U.S. Cl. ........................................ 62/136; 73/59; 366/283
[58] Field of Search ................... 366/251, 283; 73/59; 62/136, 342, 343

[56] References Cited

U.S. PATENT DOCUMENTS

| | | | |
|---|---|---|---|
| 2,142,879 | 1/1939 | Alexandrou | 366/251 |
| 2,828,113 | 3/1958 | Knibb | 366/251 |
| 3,013,398 | 12/1961 | Thomas | 62/136 |
| 3,069,866 | 12/1962 | Dunn | 62/136 |
| 3,075,480 | 1/1963 | Berg | 107/1 |
| 3,180,104 | 4/1965 | Goetz | 62/136 |
| 3,196,627 | 7/1965 | Swenson | 62/136 |
| 3,285,023 | 11/1966 | Vesper et al. | 62/58 |
| 3,359,748 | 12/1967 | Booth | 62/136 |
| 3,403,524 | 10/1968 | Mitchell et al. | 62/70 |
| 3,407,618 | 10/1968 | Mullins, Jr. | 62/136 |
| 3,410,103 | 11/1968 | Cornelius | 62/136 |
| 3,449,920 | 6/1969 | Steenburg, Jr. | 62/136 |
| 3,529,748 | 9/1970 | Mitchell et al. | 222/54 |
| 3,626,709 | 12/1971 | Yuza | 62/136 |
| 3,698,203 | 10/1972 | Stoelting | 62/136 |
| 3,823,571 | 7/1974 | Smith et al. | 62/136 |
| 3,926,414 | 12/1975 | Tanguy | 259/108 |
| 4,332,485 | 6/1982 | Woodman | 366/142 |
| 4,383,417 | 5/1983 | Martineau | 62/127 |

Primary Examiner—William E. Wayner
Attorney, Agent, or Firm—Robert C. Tucker; William David Kiesel; Timothy J. Monahan

[57] ABSTRACT

A frozen beverage machine is provided, comprising a frame containing a horizontally positioned stationary cylinder. A conventional cooling mechanism, typically comprising a compressor, a condenser, and cooling coils around the cylinder cools the cylinder. The cylinder is provided with an opening for removal of frozen beverages or ice cream. A shaft is rotatably and horizontally positioned within the frame and extends into the cylinder, where at least one beater bar is attached to the shaft. A motor assembly is operatively connected to and supported by the shaft exterior to the cylinder. A contact switch senses resistance to shaft rotation, and an adjustable spring maintains contact between the motor assembly and the contact switch until a desired resistance to shaft rotation, and thus a desired consistency of the semi-frozen beverage, is obtained. When this condition arises, the motor assembly will rotate away from the contact switch, which in turn, deactivates the cooling mechanism until the motor assembly again contacts the switch.

15 Claims, 2 Drawing Sheets

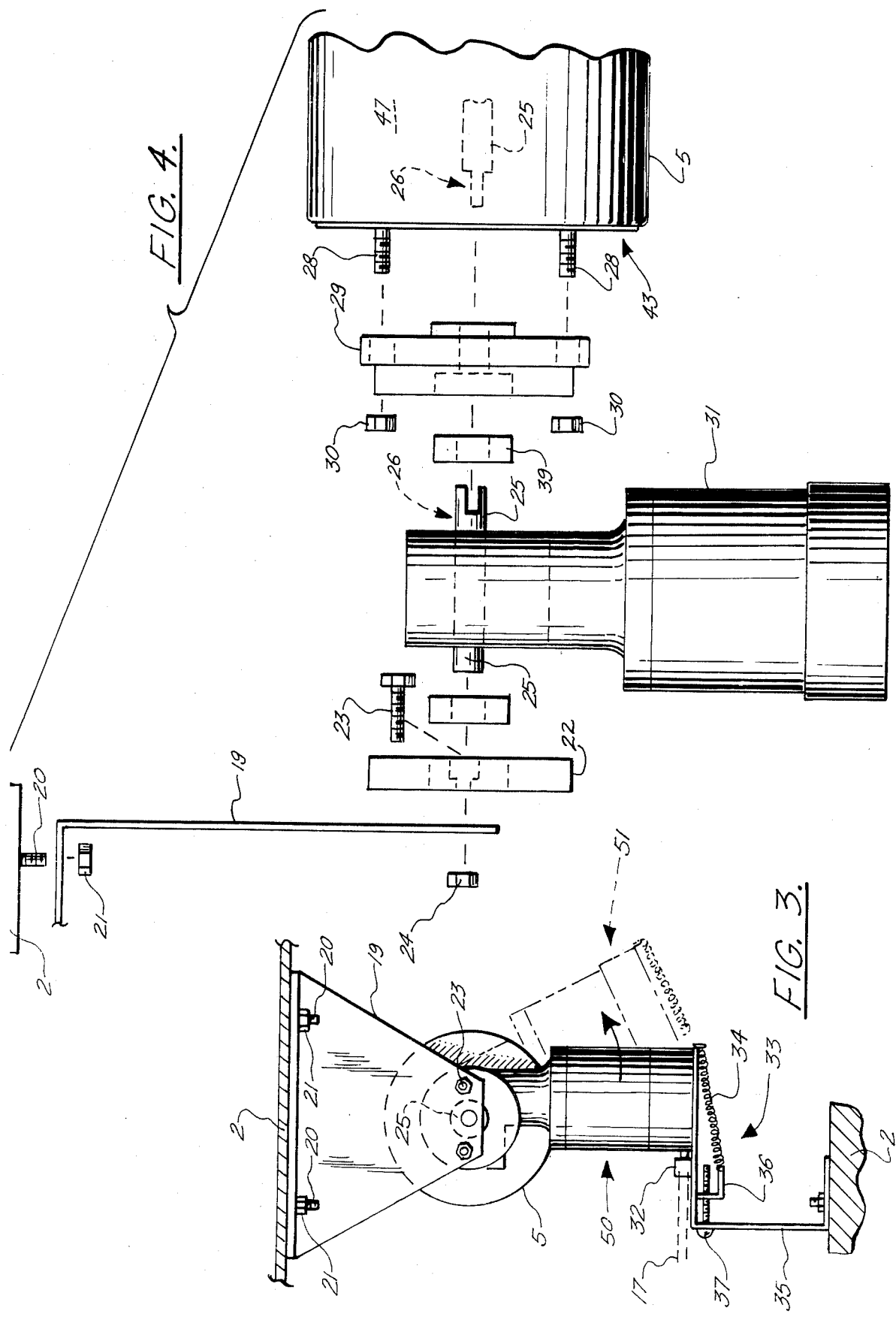

FROZEN BEVERAGE MACHINE

This is a continuation of co-pending application Ser. No. 06/806,046, filed on 12/06/85, now abandoned.

BACKGROUND OF THE INVENTION

1. Field of the Invention

This invention relates generally to frozen beverage machines and, more particularly, to miniaturized frozen beverage machines.

2. Prior Art

Frozen beverage machines are typically utilized to produce, semi-frozen beverages such as daiquiries or slushes, as well as ice cream. The consistency of the product depends upon how long a refrigeration unit cools the unfrozen product remains in a cylinder, or freezing chamber, before it is released from the machine. Various means are utilized to maintain the desired consistency of the semi-frozen mixture. Most involve some sort of switch which controls a refrigeration process which, in turn, chills the cylinder containing the product. As the product freezes and reaches a desired degree of consistency, resistance to a stirring or scraping mechanism in the cylinder generally causes the switch to disengage the refrigeration mechanism for a period of time, thus maintaining the desired consistency.

The machines currently on the market are relatively large commercial machines, employing large vertical freezing cylinders or large horizontal freezing cylinders having stirring mechanism driven by a pulley arrangement which converts high motor speed to a lower speed for stirring and scraping product from the cylinder walls. The pulley arrangement usually comprises a large pulley which drives the stirring mechanism and is connected to a small pulley on a high speed electric motor via a belt. Similar means of gear reduction, such as sprockets and chains, could also be employed, but are not preferred. It is desirable to have horizontal freezing cylinders in order to minimize the effects of gravity on the mixing process. Horizontal cylinders are also preferred in situations where height constrictions are controlling. Such is the case with frozen beverage machines designed for home use. However, even with the horizontal positioning of the freezing cylinder, the prior art use of pulleys to accomplish gear reduction from the motor requires a great deal of space. Thus, no miniaturized frozen beverage machines are currently available which are suitable for home use.

SUMMARY OF THE INVENTION

Considering the above, it is an object of this invention to provide a frozen beverage machine which is of suitable miniature size for home use, and which performs as well as large commercial machines.

It is another object of this invention to eliminate the use of pulleys in frozen beverage machines having horizontally oriented freezing cylinders.

It is still another object of this invention to provide such a frozen beverage machine which contains a minimum number of parts and is easy to maintain.

Therefore, a frozen beverage machine is provided, comprising a frame containing a horizontally positioned stationary cylinder. A conventional cooling mechanism, typically comprising a compressor, a condenser, and cooling coils around the cylinder cools the cylinder. The cylinder is provided with an opening for removal of semi-frozen beverages or ice cream. A shaft is rotatably and horizontally positioned within the frame and extends into the cylinder, where at least one scraper blade is attached to the shaft. A motor assembly is operatively connected to and suspended from the shaft exterior to the cylinder. A contact switch is fixedly positioned within the frame, and an adjustable spring maintains contact between the motor assembly and the contact switch until a desired resistance to shaft rotation occurs and a desired consistency of the semi-frozen beverage, is obtained. When this condition arises, the motor assembly will rotate away from the contact switch, which in turn, deactivates the cooling mechanism until the motor assembly again contacts the switch.

BRIEF DESCRIPTION OF THE DRAWINGS

FIG. 3 is a view taken along line 3—3 of FIG. 2.

FIG. 4 is an exploded side view of a portion of the embodiment shown in FIG. 2.

DETAILED DESCRIPTION OF PREFERRED EMBODIMENTS OF THE INVENTION

Figure 1:
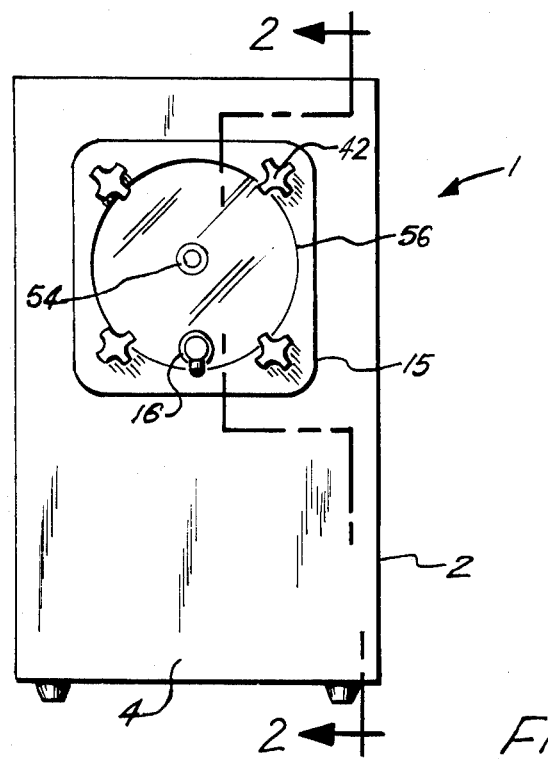
FIG. 1 is a front view of a preferred embodiment of the invention.

As shown in the Figures, the frozen beverage machine 1 comprises various interior components positioned within a frame 2, preferably totally encasing the interior components, and having a front panel 4 and a back 3. In the interior of frame 2 is a horizontally oriented cylinder 5 having a first end 43 and a second end 44, which provides a container in which the beverage is semi-frozen to a desired consistency. The second end 44 is positioned so as to face the front panel 4 of frame 2 and is positioned within front panel opening 49. Cylinder 5 is fixed in place by cylinder mounting studs 41, which preferably extend through front panel 4 of frame 2. The cylinder 5 is provided with a lip 48 which fits flushly around the exterior edge of opening 49. A cylinder retaining ring 52 fits around the cylinder 5 on the interior side of front panel 4 and is provided with threaded holes 53 into which studs 41 are screwed, thus providing a means for securing the second end 44 of cylinder 5 to front panel 4. Unfrozen product is supplied to cylinder 5 via reservoir 13 and reservoir drain 14. By maintaining a desired level in reservoir 13, a new supply of unfrozen product will flow into cylinder 5 as semi-frozen product is withdrawn. Reservoir drain 14 also provides an additional means of support for cylinder 5.

The second end 44 of cylinder 5 is provided with an opening 46 through which semi-frozen product is withdrawn for consumption. Various means may be employed for emptying cylinder 5. Preferably, opening 46 is covered by a face plate 15, which is held in place by face plate retainer nuts 42 which screw cylinder mounting studs 41. Face plate 15 and cylinders may thus be easily removed for cleaning. A valve 16 allows selective withdrawal of semi-frozen product by gravity flow. Thus, face plate 15 and valve 16 together comprise a means for emptying cylinder 5. A view plate 56 may be attached to face plate 15 in order to monitor the product level and consistency in cylinder 5.

Unfrozen product is chilled by circulation of coolant through some conventional type of refrigeration system 6, which provides a means for removing heat from cylinder 5. The refrigeration system 6 preferably comprises a compressor 7, cooling coils 8 which are wrapped around cylinder 5, and a condenser 9 having a condenser fan 10, supported by fan bracket 18. These refrigeration components are connected together by coolant piping 11. Preferably, insulation 12 is provided around cylinder 5 for efficiency. Electrical operation of these components as well as others to be described is controlled via circuit box 40 and wiring 17.

Figure 2:
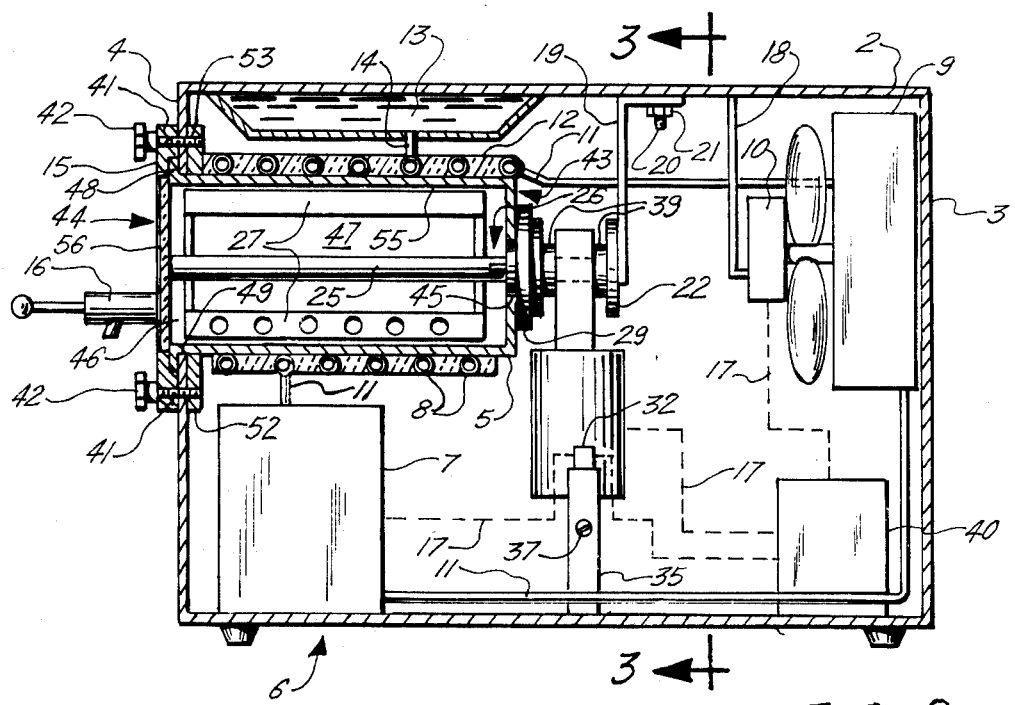
FIG. 2 is a side view taken along line 2—2 of FIG. 1.

In order to provide a flowing consistency to the product, it must be constantly stirred. Also, ice crystals must be constantly scraped from the cylinder wall 55 so as to allow more to form. This is accomplished by movement of one or more scraper blades 27 within the interior 47 of cylinder 5. Scraper blade 27 may be of various designs, so long as adequate mixing and scraping of the entire contents of cylinder 5 occurs. Scraper blade 27 is fixedly attached to a shaft 25 which rotatably and sealingly passes through opening 45 in the first end 43 of cylinder 5. A bearing plate 29 is mounted on bearing plate studs 28 extending from the first end 43 of cylinder 5. Bearing plate nuts 30 secure the bearing plate 29, which in turn secures a bearing 39, which rotatably secures shaft 25. Shaft 25 is also supported by another bearing 39 contained by motor mount 22. It is preferable the face plate bushing 54 be provided in face plate 15 for further support of shaft 5. Of course, all means of support for shaft 25 must be centered with respect to cylinder 5 in order to assure efficient operation of scraper blade 27. Motor mount 22 is fixed in position by bolts 23 and nuts 24 onto support bracket 19, which is fixedly attached to frame 2 by support brackets studs 20 and nuts 21. Of course, shaft 25 may encompass various separable lengths, as shown in FIG. 2, for ease of installation, service and cleaning. Connection between lengths may be provided by conventional means, such as slotted connection 26.

Miniaturization has been accomplished by eliminating the need for gear reduction through pulleys or chain and sprocket gear rereducers. Gear reduction is accomplished in a single motor assembly 31, having an electric motor and gear box combined in a single unit, commonly referred to as a gear motor. Motor assembly 31 is operatively connected to shaft 25 such that, when motor assembly 31 is restrained, shaft 25 will rotate when motor assembly 31 is in operation. As shown, motor assembly 31 is thus suspended from, and its weight totally supported by, the shaft 25 to which it is operably connected, greatly reducing the number of parts required by prior art devices. As shown, motor assembly 31 and shaft 25 act as a freely swinging unit, rotatably supported by bearings 39 and face plate bushing 54. Although motor assembly 31 could conceivably comprise a single motor directly driving shaft 25, horsepower (and energy) requirements are greatly reduced by a low horsepower, high speed motor in combination with a gear box which drives shaft 25 at a lower speed. One such combination which has been employed in the present invention is a 1/12 horsepower, 1550 rpm electric motor combined with a gear head which reduces shaft speed to 180 rpm (Oriental model No. 5IK60GS-AFUL/5GW10LA gear motor).

Control of the freezing process is provided by contact switch 32, which is fixedly attached to frame 2 via switch bracket 35. Contact switch 32 is operably connected to the refrigeration system 6 via wiring 17 and circuit box 40 such that, when contact switch 32 is activated, the refrigeration system 6 is likewise activated. Contact switch 32 is positioned so as to maintain contact with motor assembly 31 when it is in its normal activated position 50, shown in FIGS. 3. A resilient means such as spring assembly 23 biases motor assembly 31 in the activated position 50, permitting motor assembly 31 to turn shaft 25. Preferably, spring assembly 33 comprises a spring 34, which is fixedly attached at one end to motor assembly 31 and at the other end to a spring bracket 36, which is adjustably connected to a fixed surface such as switch bracket 35 by means such as adjustment screw 37.

As increased resistance to scraper blade 27 is encountered during the freezing process, spring assembly 33 holds motor assembly 31 in contact with contact switch 32 until the resistance overcomes the force of the spring assembly 33 enough to rotate motor assembly 31 (counterclockwise in the embodiment shown) away from contact switch 32 to a deactivated position 51. In deactivated position 51, motor assembly 31 continues to turn shaft 25, maintaining product mixing action. However, refrigeration system 6 is deactivated until product consistency permits spring assembly 33 to draw motor assembly 31 back into contact with contact switch 32, again activating coolant circulation by refrigeration system 6. It is preferable that a delay switch (not shown) be provided in the contact switch circuitry to prevent slight movements of the motor assembly 31 from rapidly activating and deactivating refrigeration system 6. By adjusting the tension of spring assembly 33 (by turning adjustment screw 37), the consistency of the semi-frozen product may be controlled with great accuracy. Of course, contact switch 32 could also be positioned (not shown) such that contact (and, consequently, deactivation of refrigeration system 6) occurs when motor assembly 31 reaches deactivated position 51.

The frozen beverage machine of this invention has eliminated the bulk and many of the parts required by prior art machines, while providing simpler, more efficient operation. While this invention is particularly adaptable to restricted space requirements, there is no restriction to utilizing the invention in machines having large, commercial-sized cylinders, saving valuable space. Other embodiments of this invention will occur to those skilled in the art, and are intended to be within the scope and spirit of the following claims.

I claim:

1. A frozen beverage machine, comprising:
  a. a frame having an exterior, an interior, a front and a back;
  b. a cylinder, having an interior and an exterior as well as first and second ends and further having an opening in each of said ends , said cylinder being horizontally and fixedly positioned within said interior of said frame with said second end facing said front of said frame;
  c. a means, sealingly attached to said opening in said second end of said cylinder, for emptying said cylinder;
  d. a means, positioned within said frame and communicating with said exterior of said cylinder, for removing heat from said cylinder;
  e. at least one support bracket, fixedly attached to said frame and positioned in said interior of said frame between said first end of said cylinder and said back of said frame, said support bracket having an opening therein, said opening in said support bracket being aligned with said opening in said first end of said cylinder;
  f. a shaft, rotatably attached within said opening in said support bracket and rotatably and sealingly attached within said opening in said first end of said cylinder and extending to said interior of said cylinder, said shaft having at least one scraper blade, fixedly attached to said shaft within said interior of said cylinder;
g. a motor assembly, operatively connected to a portion of said shaft exterior to said cylinder and suspended from said shaft such that the weight of said motor assembly is supported only by said shaft;
h. a contact switch, fixedly attached to said frame and operatively connected to said means for removing heat to as to activate or deactivate said means for removing heat according to the position of said contact switch, said contact switch being positioned such that said contact switch will activate said means for removing heat when there is substantially no resistance within said interior of said cylinder to rotation of said shaft; and
i. a resilient means, connected to said frame and said motor assembly, for maintaining the position of said motor assembly relative to said shaft until a desired threshold resistance to rotation of said shaft within said cylinder occurs, and then allowing said motor assembly to rotate to a desired position relative to said shaft.

2. A frozen beverage machine according to claim 1, wherein said resilient means comprises a spring assembly, adjustably connected to said frame and said motor assembly such that said desired threshold resistance is adjustable.

3. A frozen beverage machine according to claim 2, further comprising a switch bracket, fixedly attached to said frame and wherein said contact switch is fixedly attached to said switch bracket, and said spring assembly comprises a spring, connected at one end to said motor assembly and at the other end to a spring bracket, which is threadably attached to an adjustment screw, which is rotatably attached to said switch bracket.

4. A frozen beverage machine according to claim 1, wherein said motor assembly comprises a motor and a gear reduction unit, operatively connected together as a single unit.

5. A frozen beverage machine according to claim 3, wherein said motor assembly comprises a motor and a gear reduction unit, operatively connected together as a single unit.

6. A frozen beverage machine according to claim 1, wherein said contact switch is in communication with said motor assembly.

7. A frozen beverage machine according to claim 6, wherein rotation of said motor assembly in response to resistance to rotation of said shaft will deactivate said refrigeration system.

8. A frozen beverage machine, comprising:
(a) a frame;
(b) a cylinder horizontally affixed to said frame, said cylinder having a first end and a second end opposite said first end;
(c) a means connected to said cylinder for emptying said beverage from said cylinder;
(d) a means in communication with an exterior of said cylinder, for removing heat from said cylinder;
(e) a shaft extending from an interior of said cylinder through an opening in said first end to protrude from said cylinder, said shaft being free to rotate;
(f) a scraper blade affixed to a section of said shaft within said interior of said cylinder;
(g) a motor assembly having its weight totally supported by said shaft and engaged to rotate said shaft, said motor assembly further having a freely swinging end; an
(h) a contact switch, operatively connected to said means for removing heat and in communication with said motor assembly whereby said contact switch is triggered to deactivate said means for removing heat by said motor assembly swinging.

9. A frozen beverage machine according to claim 8 wherein said motor assembly is a gear motor.

10. A frozen beverage machine according to claim 9 further comprising a resilient means, connected to said frame and said gear motor, for aligning said gear motor with respect to said frame, wherein said resilient means allows said motor assembly to swing when a threshold resistance to rotation of said shaft occurs.

11. A frozen beverage machine according to claim 10, wherein said resilient means comprises an adjustable spring assembly.

12. A frozen beverage machine according to claim 11 wherein said contact switch is positioned to activate said means for removing heat when said gear motor is in a vertical position.

13. A frozen beverage machine according to claim 1 wherein said motor assembly is a gear motor.

14. A frozen beverage machine, comprising:
(a) a frame;
(b) a cylinder horizontally affixed to said frame, said cylinder having a first end and a second end opposite said first end;
(c) a means connected to said cylinder for emptying said beverage from said cylinder;
(d) a means in communication with an exterior of said cylinder, for removing heat from said cylinder;
(e) a shaft extending from an interior of said cylinder through an opening in said first end to protrude from said cylinder, said shaft being free to rotate;
(f) a scraper blade affixed to a section of said shaft within said interior of said cylinder;
(g) a gear motor having an end engaged to rotate said shaft and a freely swinging end, wherein said gear motor's weight is totally supported by said shaft and said weight counteracts resistance to said shaft's rotation;
(h) a contact switch, operatively connected to said means for removing heat and in communication with said gear motor whereby said contact switch is triggered to deactivate said means for removing heat by said gear motor swinging.

15. A frozen beverage machine according to claim 14 further comprising a resilient means, connected to said frame and said gear motor, for aligning said gear motor with respect to said frame, wherein said resilient means allows said motor assembly to swing when a threshold resistance to rotation of said shaft occurs.

* * * * *